United States Patent
Wang et al.

(10) Patent No.: US 12,229,376 B2
(45) Date of Patent: Feb. 18, 2025

(54) TOUCH-CONTROL DISPLAY PANEL, TOUCH-CONTROL DISPLAY APPARATUS AND METHOD FOR MANUFACTURING TOUCH-CONTROL LAYER

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Wei Wang, Beijing (CN); Tianci Chen, Beijing (CN); Yi Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/245,145

(22) PCT Filed: Jan. 29, 2022

(86) PCT No.: PCT/CN2022/075023
§ 371 (c)(1),
(2) Date: Mar. 13, 2023

(87) PCT Pub. No.: WO2023/142048
PCT Pub. Date: Aug. 3, 2023

(65) Prior Publication Data
US 2024/0302930 A1    Sep. 12, 2024

(51) Int. Cl.
G06F 3/044    (2006.01)
G06F 3/041    (2006.01)

(52) U.S. Cl.
CPC .......... G06F 3/0446 (2019.05); G06F 3/0412 (2013.01); *G06F 2203/04103* (2013.01)

(58) Field of Classification Search
CPC ......... G06F 3/0446; G06F 2203/04112; G06F 3/0412; G06F 3/0443; G06F 2203/04111; G06F 3/0448; H10K 59/40
See application file for complete search history.

(56) References Cited

U.S. PATENT DOCUMENTS

| 10,976,871 | B2* | 4/2021 | Lee ............ G06F 3/0416 |
| 2011/0007030 | A1 | 1/2011 | Mo et al. |

(Continued)

FOREIGN PATENT DOCUMENTS

| CN | 101943975 A | 1/2011 |
| CN | 103472951 A | 12/2013 |

(Continued)

*Primary Examiner* — Koosha Sharifi-Tafreshi
(74) *Attorney, Agent, or Firm* — McCoy Russell LLP (57) ABSTRACT

A touch-control display panel is provided, which includes a touch-control layer and a display functional layer, where the touch-control layer includes a plurality of first touch-control electrodes and a plurality of second touch-control electrodes; the first touch-control electrode includes a plurality of first touch-control electrode blocks, each of the first touch-control electrode blocks includes at least one first hollowed-out region and at least one second hollowed-out region, an area of the first hollowed-out region is larger than an area of the second hollowed-out region; and the touch-control layer further includes at least one first dummy electrode and at least one second dummy electrode, where the first dummy electrode is located in the corresponding first hollowed-out region, and the second dummy electrode is located in the corresponding second hollowed-out region.

17 Claims, 7 Drawing Sheets

(56) References Cited

U.S. PATENT DOCUMENTS

| | | |
|---|---|---|
| 2015/0077650 A1 | 3/2015 | Huang et al. |
| 2020/0218391 A1* | 7/2020 | Kamiya .................. H10K 50/86 |
| 2021/0173524 A1* | 6/2021 | Deng .................... G06F 3/0443 |
| 2021/0343951 A1 | 11/2021 | Ju |
| 2022/0113854 A1 | 4/2022 | He et al. |
| 2022/0276741 A1 | 9/2022 | Ye |
| 2022/0404929 A1 | 12/2022 | Shu et al. |
| 2022/0413677 A1 | 12/2022 | Zhang et al. |

FOREIGN PATENT DOCUMENTS

| | | | | |
|---|---|---|---|---|
| CN | 108646952 A | 10/2018 | | |
| CN | 110442254 A | 11/2019 | | |
| CN | 111158516 A | 5/2020 | | |
| CN | 111258462 A | 6/2020 | | |
| CN | 111722762 A | 9/2020 | | |
| CN | 112198987 A | 1/2021 | | |
| CN | 214122919 U | 9/2021 | | |
| CN | 113611724 A | 11/2021 | | |
| CN | 114168016 A * | 3/2022 | ........... G06F 3/0446 |
| KR | 20110049512 A | 5/2011 | | |
| WO | 2021102798 A1 | 6/2021 | | |
| WO | 2021217614 A1 | 11/2021 | | |

* cited by examiner

TOUCH-CONTROL DISPLAY PANEL, TOUCH-CONTROL DISPLAY APPARATUS AND METHOD FOR MANUFACTURING TOUCH-CONTROL LAYER

CROSS REFERENCE TO RELATED APPLICATION

This application is the U.S. national phase of PCT Application No. PCT/CN2022/075023 filed on Jan. 29, 2022, which is incorporated herein by reference in its entirety.

TECHNICAL FIELD

The present disclosure relates to the technical field of display, in particular to a touch-control display panel, a touch-control display apparatus and a method for manufacturing a touch-control layer.

BACKGROUND

In the related art, due to the long size of the mobile phone and the vertical arrangement of the driving electrodes (Tx), there is a voltage drop between a first driving electrode and a last driving electrode, so that there is a voltage drop between a first touch-control unit and a last touch-control unit of a touch-control electrode structure, which affects the touch-control effect. In addition, the bridge electrodes connecting the adjacent sensing electrodes (Rx) may have visibility problems under strong light.

SUMMARY

A first aspect of the present disclosure provides a touch-control display panel, including a touch-control layer and a display functional layer, where the touch-control layer is located at a light-emitting side of the display functional layer, and the touch-control layer includes a plurality of first touch-control electrodes extending in a first direction and arranged in a second direction and a plurality of second touch-control electrodes extending in the second direction and arranged in the first direction, the first direction and the second direction are intersected;

the plurality of first touch-control electrodes and the plurality of second touch-control electrodes are intersected and insulated, where each of the first touch-control electrodes includes a plurality of first touch-control electrode blocks, each of the first touch-control electrode blocks includes at least one first hollowed-out region and at least one second hollowed-out region surrounding the first hollowed-out region and having a certain spacing from the first hollowed-out region, an area of the first hollowed-out region is larger than an area of the second hollowed-out region; and the touch-control layer further includes at least one first dummy electrode and at least one second dummy electrode, where the first dummy electrode is located in the corresponding first hollowed-out region, and the second dummy electrode is located in the corresponding second hollowed-out region, the at least one first dummy electrode and the at least one second dummy electrode are arranged in the same layer as, and insulated from the first touch-control electrodes.

Optionally, each of the second touch-control electrodes includes a plurality of second touch-control electrode blocks, and each of the second touch-control electrode blocks includes at least one third hollowed-out region and at least one fourth hollowed-out region surrounding the third hollowed-out region and having a certain spacing from the third hollowed-out region, an area of the third hollowed-out region is larger than an area of the fourth hollowed-out region; and the touch-control layer further includes at least one third dummy electrode and at least one fourth dummy electrode, where the third dummy electrode is located in the corresponding third hollowed-out region, and the fourth dummy electrode is located in the corresponding fourth hollowed-out region, the at least one third dummy electrode and the at least one fourth dummy electrode are arranged in the same layer as, and insulated from the second touch-control electrodes.

Optionally, the second hollowed-out regions have a same area, and the fourth hollowed-out regions have a same area.

Optionally, an area of the first hollowed-out region is the same as that of the third hollowed-out region, and an area of the second hollowed-out region is the same as that of the fourth hollowed-out region.

Optionally, the number of the second hollowed-out region is the same as that of the fourth hollowed-out region.

Optionally, shapes of the first hollowed-out region, the second hollowed-out region, the third hollowed-out region and the fourth hollowed-out region are approximately square.

Optionally, an edge of each of the first touch-control electrode blocks includes a plurality of first protrusions; an edge of each of the second touch-control electrode blocks includes a plurality of second protrusions; the plurality of first protrusions and the plurality of second protrusions are nested with each other.

Optionally, an edge of the first dummy electrode includes a plurality of third protrusions; and an edge of the third dummy electrode includes a plurality of fourth protrusions.

Optionally, the first protrusion and the second protrusion have a same shape, the third protrusion and the fourth protrusion have a same shape, and shapes of the first protrusion, the second protrusion, the third protrusion and the fourth protrusion include at least one of the following: convex, rectangle, triangle or trapezoid.

Optionally, adjacent first touch-control electrode blocks in the same first touch-control electrode are electrically connected through a first conductive connection element, and adjacent second touch-control electrode blocks in the same second touch-control electrode are electrically connected through a second conductive connection element, each of the first touch-control electrode blocks, each of the second touch-control electrode blocks, and the first conductive connection element are arranged in the same layer and made of the same material, an insulating layer is arranged between the first conductive connection element and the second conductive connection element, and the second conductive connection element is electrically connected to adjacent second touch-control electrode blocks through via holes in the insulating layer.

Optionally, each of the first touch-control electrode block, the second touch-control electrode block and the first conductive connection element includes a grid-shaped structure, and is formed by a plurality of metal grids.

Optionally, a grid-shaped structure at a boundary between the first touch-control electrode block and the second touch-control electrode block includes a first incision.

Optionally, the second conductive connection element includes at least two conductive connection patterns arranged at intervals, and each of the conductive connection patterns is configured to connect adjacent second touch-control electrode blocks in the same second touch-control electrode, an orthographic projection of each of the conductive connection patterns onto the display functional layer and an orthographic projection of the grid-shaped structure of the first conductive connection element onto the display functional layer have at least two intersection nodes.

Optionally, the at least two conductive connection patterns arranged at intervals include at least one group of conductive connection patterns, each group of conductive connection patterns includes two conductive connection patterns, two conductive connection patterns in each group of conductive connection patterns are symmetrical with a center line of each group of conductive connection patterns in the second direction.

Optionally, each of the conductive connection patterns includes two metal grids and a conductive connection line connecting the two metal grids, the conductive connection line includes a first part extending in a third direction and a second part extending in a fourth direction, the first part and the second part are connected with each other.

Optionally, the orthographic projection of the two metal grids of each of the conductive connection patterns on the display functional layer and the orthographic projection of the two metal grids of the first conductive connection element on the display functional layer are overlapped.

Optionally, the display panel includes: a plurality of repeating units, each of the repeating units includes four pixel units, each of the pixel units includes four sub-pixels, sixteen sub-pixels of each of the repeating units are arranged in RGBG pixel arrangement form; four metal grids in the plurality of metal grids included in each of the first touch-control electrode blocks are respectively corresponding to sub-pixels at four top corners of corresponding repeating units, four metal wires of each of metal grids in the four metal grids do not include incisions.

Optionally, each of the first touch-control electrode blocks further includes at least one group of metal wires, each group of metal wires includes eight metal wires, the eight metal wires are located around each of metal grids in the four metal grids, and connected to each of metal grids in the four metal grids, four metal wires in the eight metal wires have second incisions.

Optionally, among the eight metal wires, metal wires with the second incisions and metal wires without the second incisions are arranged alternately in boundary extension directions of the metal grids.

Optionally, the touch-control layer includes a plurality of touch-control units, and each of the touch-control units includes: at least a part of the two first touch-control electrode blocks connected at an intersection, and at least a part of the two second touch-control electrode blocks connected at the intersection; each of the touch-control units covers the corresponding M×M pixel units in the display panel, where M is an odd number.

Optionally, the touch-control layer includes a plurality of touch-control modules, each of the touch-control modules includes four touch-control units arranged in a 2×2 matrix.

A second aspect of the present disclosure provides a touch-control display apparatus, including the touch-control display panel as described in the first aspect.

A third aspect of the present disclosure provides a manufacturing method of touch-control layer, including:

forming a plurality of first touch-control electrodes extending in a first direction and arranged in a second direction, where the first touch-control electrode includes a plurality of first touch-control electrode blocks, each of the first touch-control electrode blocks includes at least one first hollowed-out region and at least one second hollowed-out region that surrounds the first hollowed-out region and has a certain spacing from the first hollowed-out region, and an area of the first hollowed-out region is larger than an area of the second hollowed-out region;

forming a plurality of second touch-control electrodes extending in the second direction and arranged in the first direction, where the first direction and the second direction are intersected, and the plurality of first touch-control electrodes and the plurality of second touch-control electrodes are arranged being intersected and insulated; and forming at least one first dummy electrode and at least one second dummy electrode, where the first dummy electrode is located in the corresponding first hollowed-out region, the second dummy electrode is located in the corresponding second hollowed-out region, and the at least one first dummy electrode and the at least one second dummy electrode are arranged in the same layer as the first touch-control electrodes, and insulated from the first touch-control electrodes.

REFERENCE SIGNS 10 touch-control layer
20 touch-control unit
110 first touch-control electrode
120 second touch-control electrode
111 first touch-control electrode block
121 second touch-control electrode block
122 second conductive connection element 130 first dummy electrode
140 second dummy electrode
150 third dummy electrode
160 fourth dummy electrode
1101 first protrusion
1201 second protrusion
1301 third protrusion
1501 fourth protrusion
L1 first conductive connection line
L2 second conductive connection line
L3 third conductive connection line
L4 fourth conductive connection line
C1 first incision
C2 second incision

DETAILED DESCRIPTION

In order to make the to-be-solved technical problems, technical solutions and advantages of the embodiments of the present disclosure clearer, the following will be described in detail with reference to the drawings and specific embodiments.

The touch-control electrode structure in mutual capacitive manner includes driving electrodes (Tx) and sensing electrodes (Rx). The driving electrode and the touch-control electrode form a mutual capacitor for realizing touch-control detection. The driving electrode is used for inputting an excitation signal, and the sensing electrode is used for outputting a sensing signal. The sensing signal is received from the laterally extending sensing electrode by inputting the excitation signal to the longitudinally extending driving electrode. When a finger touches the capacitive screen, the coupling between the driving electrode and the sensing electrode near the touch point is affected, and the capacitance between the two electrodes is changed. According to the two-dimensional capacitance change data of the touch screen, the coordinates of the touch point can be calculated. The touch-control region of a touch-control display apparatus is usually rectangular, one of the driving electrode and the sensing electrode extends in the length direction of the rectangle, and the other extends in the width direction of the rectangle; the touch-control electrode extending in the length direction is longer and has a larger load.

The present disclosure provides a touch-control display apparatus, including a touch-control layer and a display functional layer, where the touch-control layer is located at a light-emitting side of the display functional layer, and the touch-control layer includes a plurality of first touch-control electrodes extending in a first direction and arranged in a second direction, and a plurality of second touch-control electrodes extending in the second direction and arranged in the first direction, the first direction and the second direction are intersected; the plurality of first touch-control electrodes and the plurality of second touch-control electrodes are intersected and insulated, where the first touch-control electrode includes a plurality of first touch-control electrode blocks, each of the first touch-control electrode blocks includes at least one first hollowed-out region and at least one second hollowed-out region that surrounds the first hollowed-out region and has a certain spacing from the first hollowed-out region, an area of the first hollowed-out region is larger than an area of the second hollowed-out region; and the touch-control layer further includes at least one first dummy electrode and at least one second dummy electrode, where the first dummy electrode is located in the corresponding first hollowed-out region, and the second dummy electrode is located in the corresponding second hollowed-out region, the at least one first dummy electrode and the at least one second dummy electrode are arranged in a same layer as the first touch-control electrodes, and insulated from the first touch-control electrodes.

The touch-control display apparatus provided by the embodiments of the present disclosure can reduce the self-capacitance (parasitic capacitance) on the first touch-control electrode block by providing at least one first hollowed-out region and at least one second hollowed-out region on the first touch-control electrode block, thereby improving the touch-control sensitivity of the touch-control layer. In addition, dummy electrodes are arranged at positions corresponding to the first hollowed-out region and the at least one second hollowed-out region, the uniformity of the film layer can be improved, so as to improve product yield.

In some examples, the second touch-control electrode includes a plurality of second touch-control electrode blocks, and each of the second touch-control electrode blocks includes at least one third hollowed-out region and at least one fourth hollowed-out region that surrounds the third hollowed-out region and has a certain spacing from the third hollowed-out region, an area of the third hollowed-out region is larger than an area of the fourth hollowed-out region. The touch-control layer further includes at least one third dummy electrode and at least one fourth dummy electrode, where the third dummy electrode is located in the corresponding third hollowed-out region, and the fourth dummy electrode is located in the corresponding fourth hollowed-out region, the at least one third dummy electrode and the at least one fourth dummy electrode are arranged in the same layer as the second touch-control electrode and insulated from the second touch-control electrode.

The touch-control display apparatus provided by the embodiments of the present disclosure can reduce the self-capacitance (parasitic capacitance) on the second touch-control electrode block by providing at least one third hollowed-out region and at least one fourth hollowed-out region on the second touch-control electrode block, thereby improving the touch-control sensitivity of the touch-control layer. In addition, dummy electrodes are arranged at positions corresponding to the third hollowed-out region and the at least one fourth hollowed-out region, the uniformity of the film layer can be improved, so as to improve product yield.

Figure 1:
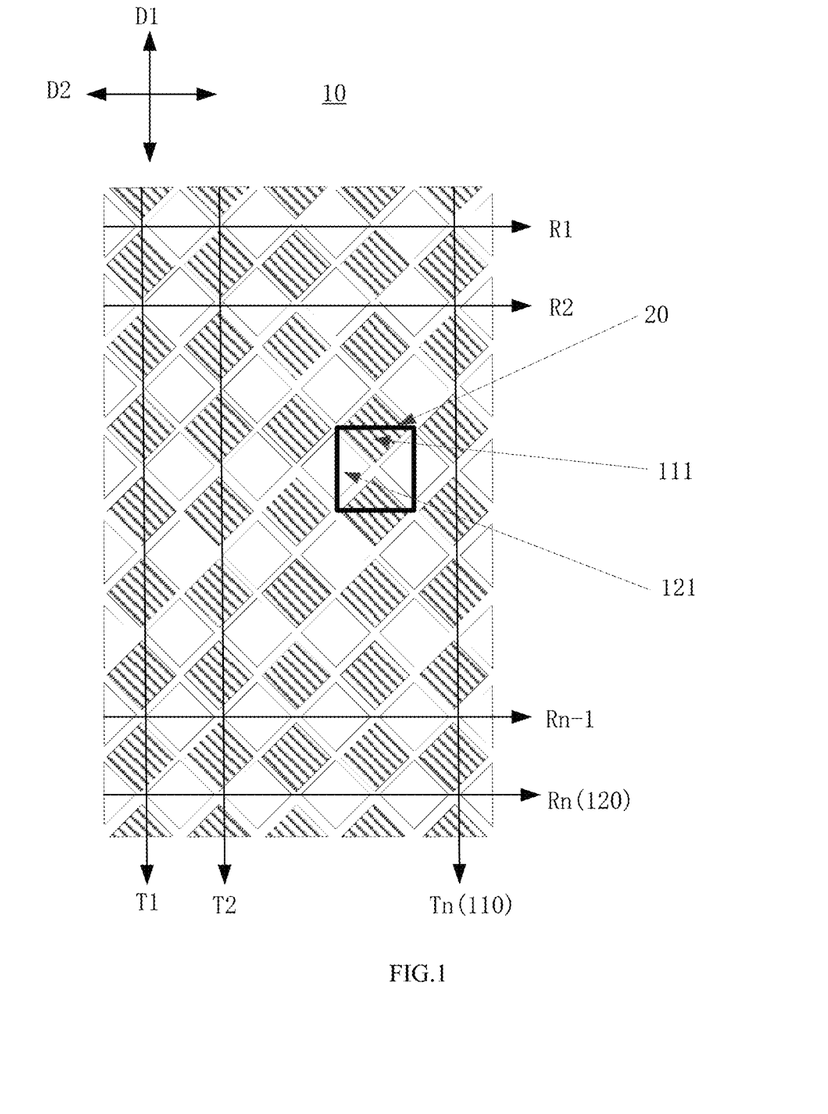
FIG. 1 is a schematic view of a touch layer provided by an embodiment of the present disclosure.

FIG. 1 is a schematic view of a touch-control layer provided by an embodiment of the present disclosure. As shown in FIG. 1, the touch-control layer 10 includes a plurality of first touch-control electrodes 110 (T1-Tn) extending in a first direction D1 and a plurality of second touch-control electrodes 120 (R1-Rn) extending in a second direction D2, where the first direction D1 and the second direction D2 are intersected, for example, orthogonal. The length of the first touch-control electrode 110 in the first direction D1 is greater than the length of the second touch-control electrode 120 in the second direction, therefore, the first touch-control electrode 110 has a larger load than the second touch-control electrode.

As an example, the first touch-control electrode 110 is a driving electrode, and the second touch-control electrode 120 is a sensing electrode. In other examples, the first touch-control electrode 110 may be a sensing electrode, and the second touch-control electrode may be a driving electrode.

The first touch-control electrode 110 includes a plurality of first touch-control electrode blocks 111 connected in the first direction D1 in sequence, and the second touch-control electrode 120 includes a plurality of second touch-control electrode blocks 121 connected in the second direction D2 in sequence. As shown in FIG. 1, both the first touch-control electrode block 111 and the second touch-control electrode block 121 are diamond-shaped. In other examples, the first touch-control electrode block and the second touch-control electrode block may be triangular or strip-shaped.

The first touch-control electrode 110 and the second touch-control electrode 120 are insulated and intersected with each other, and a plurality of touch-control units 20 are formed at the intersections. Each touch-control unit 20 includes half areas of two first touch-control electrode blocks 111 adjacent to each other and half areas of two second touch-control electrode blocks 121 adjacent to each other. The area of each touch-control unit 20 is equivalent to the area where a human finger touches the touch-control panel. If the area of the touch-control unit is too large, it may cause touch-control blind spots appeared on the panel, and if the area of the touch-control unit is too small, it may cause false touch signal.

Figure 2:
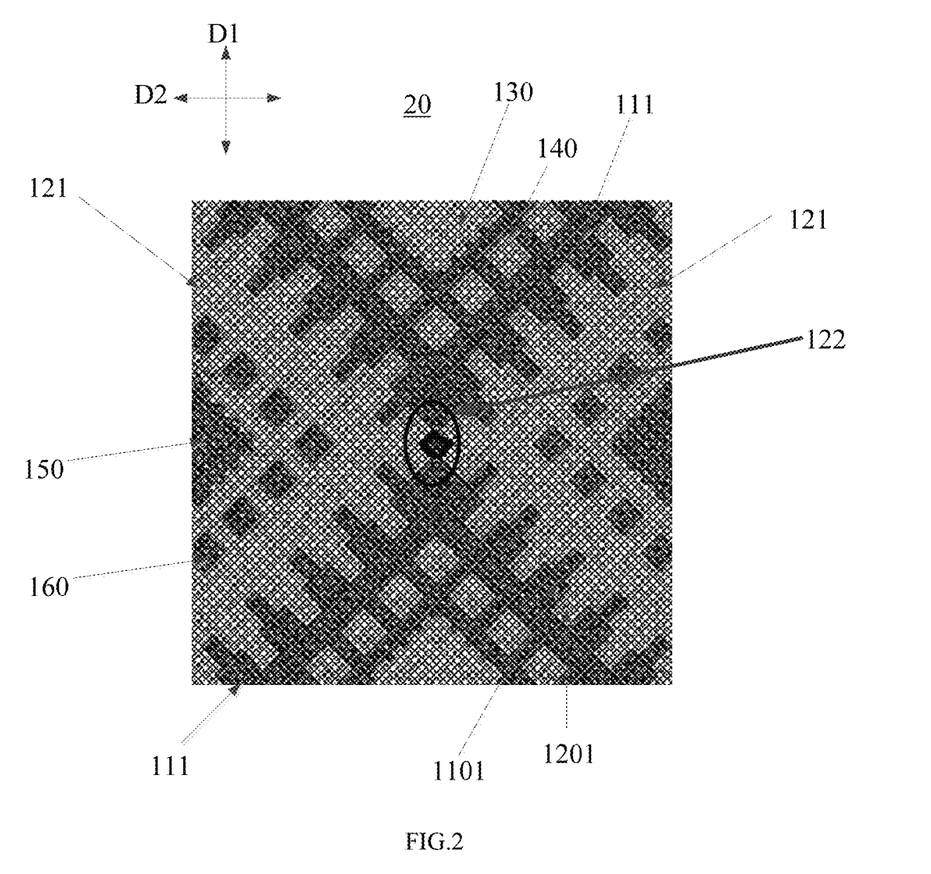
FIG. 2 is an enlarged schematic view of a touch-control unit provided by an embodiment of the present disclosure.

FIG. 2 is an enlarged schematic view of a touch-control unit provided by an embodiment of the present disclosure. As shown in FIG. 2, each touch-control unit 20 includes half areas of two first touch-control electrode blocks 111 adjacent to each other and half areas of two second touch-control electrode blocks 121 adjacent to each other.

Figure 3:
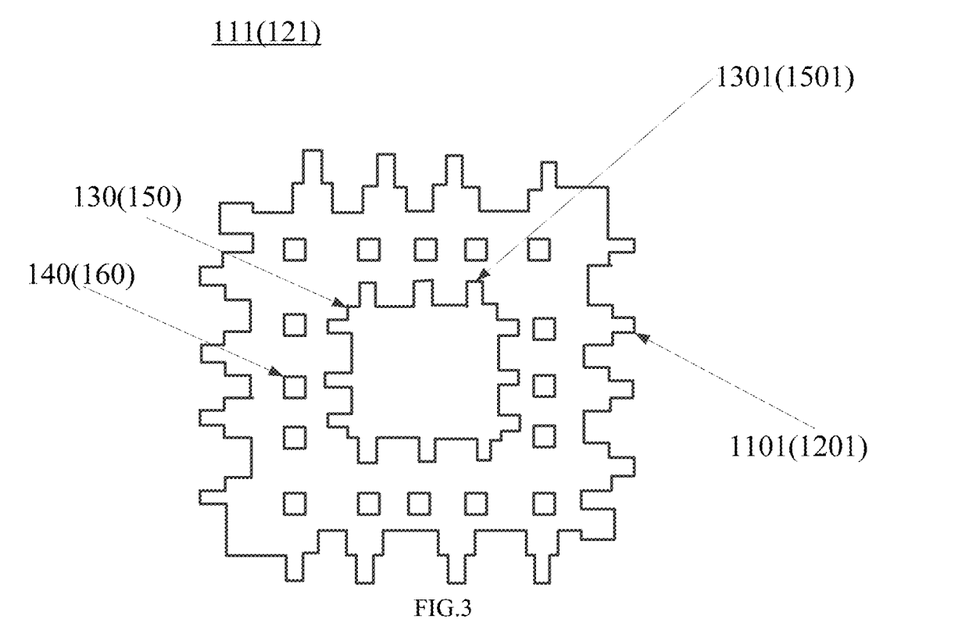
FIG. 3 is a schematic view of a touch-control electrode block provided by an embodiment of the present disclosure.

FIG. 3 is a schematic view of a touch-control electrode block provided by an embodiment of the present disclosure, where the touch-control electrode block shown in FIG. 3 may be the first touch-control electrode block 111 or the second touch-control electrode block 121.

As shown in FIG. 2 and FIG. 3, the first touch-control electrode block 111 includes at least one first hollowed-out region, and at least one second hollowed-out region is arranged around the at least one first hollowed-out region. There is a certain spacing between the at least one second hollowed-out region and the at least one first hollowed-out region, where each edge of the first hollowed-out region has a raised portion.

The area of the first hollowed-out region is larger than the area of the second hollowed-out region. The electrode area of the touch-control electrode is reduced by arranging the hollowed-out region, and the self-capacitance (parasitic capacitance) on the touch-control electrode is reduced, thereby reducing the load on the touch-control electrode. By arranging the second hollowed-out region, the area of the hollowed-out region is increased, and simultaneously, touch-control blind spots caused by the large area of the first hollowed-out region are prevented.

In some examples, the hollowed-out region may be only provided on the first touch-control electrode 110 without being provided on the second touch-control electrode 120, which can simplify the process.

In addition, as shown in FIG. 2 and FIG. 3, the touch-control layer 10 further includes at least one first dummy electrode 130 and at least one second dummy electrode 140, and the at least one first dummy electrode 130 is surrounded with at least one second dummy electrode 140. The first dummy electrode 130 is located in the corresponding first hollowed-out region, the second dummy electrode 140 is located in the corresponding second hollowed-out region, the first dummy electrode 130 and the at least one second dummy electrode 140 are arranged in the same layer as, and insulated from the first touch-control electrode 110.

"Same-layer arrangement" in the present disclosure means that two or more structures are formed by the same film layer with the same or different patterning processes, so the materials are the same.

The first dummy electrode 130 and the second dummy electrode 140 are in a floating state, that is, they are not electrically connected to other structures or do not receive any electrical signal.

In addition, as shown in FIG. 2, the touch-control layer 10 further includes at least one third dummy electrode 150 and at least one fourth dummy electrode 160, and at least one fourth dummy electrode 160 is arranged around the at least one third dummy electrode 150. The third dummy electrode 150 is located in the corresponding third hollowed-out region, the fourth dummy electrode 160 is located in the corresponding fourth hollowed-out region, the third dummy electrode 150 and the at least one fourth dummy electrode 160 are arranged in the same layer as, and insulated from the second touch-control electrode 120.

The third dummy electrode 150 and the fourth dummy electrode 160 are in a floating state, that is, they are not electrically connected to other structures or do not receive any electrical signal. In some embodiments, the areas of the second hollowed-out regions are the same, and the areas of the fourth hollowed-out regions are the same.

The areas of the second hollowed-out regions are enabled to be the same, the manufacturing process can be simplified, the uniformity of the film layer where the electrodes are located can be improved, and the process yield can be improved; similarly, the areas of the fourth hollowed-out regions are enabled to be the same, the manufacturing process can also be simplified, the uniformity of the film layer where the electrodes are located can be improved, and the process yield can be improved.

In some embodiments, the area of the first hollowed-out region is the same as that of the third hollowed-out region, and the area of the second hollowed-out region is the same as that of the fourth hollowed-out region. Similarly, the above-mentioned arrangement can simplify the manufacturing process, improve the uniformity of the film layer where the electrode is located, and improve the process yield.

In some embodiments, the number of the second hollowed-out region is the same as the number of the fourth hollowed-out region, the above-mentioned arrangement can improve the uniformity of the film layer where the electrode is located and improve the process yield.

In some embodiments, shapes of the first hollowed-out region, the second hollowed-out region, the third hollowed-out region and the fourth hollowed-out region are all square, and the above-mentioned arrangement can improve the uniformity of the film layer where the electrode is located, and improve process yield.

It should be noted that the same area of the hollowed-out regions means being approximately same, and within the allowable range of process errors.

In some embodiments, the edge of the first touch-control electrode block includes a plurality of first protrusions; the edge of the second touch-control electrode block includes a plurality of second protrusions; the plurality of first protrusions and the plurality of second protrusions are nested with each other; and the shapes of the first protrusions and the second protrusions are the same or different.

Increasing the region where the first touch-control electrode 110 and the second touch-control electrode 120 are coupled, that is, increasing the side lengths of the first touch-control electrode 110 and the second touch-control electrode 120 that are opposite to each other, can provide mutual capacitance between the first touch-control electrode 110 and the second touch-control electrode 120, thereby providing touch-control sensitivity.

The plurality of first protrusions of the first touch-control electrode and the plurality of second protrusions of the second touch-control electrode of the touch-control unit are enabled to be nested with each other to form a mutual capacitance, the circumference of the touch-control unit may be increased under the same area, so the mutual capacitance can be effectively increased without increasing the self-capacitance (parasitic capacitance) of the touch-control unit, thereby improving the touch-control sensitivity.

As shown in FIG. 2 and FIG. 3, the edge of the first touch-control electrode block 111 includes a plurality of first protrusions 1101; the edge of the second touch-control electrode block 121 includes a plurality of second protrusions 1201; the plurality of first protrusions 1101 and the plurality of second protrusions 1201 are nested with each other; shapes of the first protrusions 1101 and the second protrusions 1201 are the same or different.

In some embodiments, the edge of the first dummy electrode includes a plurality of third protrusions 1301; the edge of the third dummy electrode includes a plurality of fourth protrusions 1501.

In some embodiments, the first protrusion and the second protrusion have the same shape, the third protrusion and the fourth protrusion have the same shape, and the shapes of the first protrusion, the second protrusion, the third protrusion and the fourth protrusion include at least one of the following: convex, rectangle, triangle or trapezoid.

In the embodiments of the present disclosure, the shapes of the first protrusion and the second protrusion are enabled to be the same, and the shapes of the first protrusion and the second protrusion are enabled to be polygonal, which can increase the circumference of the touch-control unit under the same area, so the mutual capacitance can be effectively improved without increasing the self-capacitance (parasitic capacitance) of the touch-control unit, thereby improving the touch-control sensitivity.

In addition, the driving electrodes or the sensing electrodes are connected through a bridge electrode, and the bridge electrode is usually communicated by a double bridge, each bridge has two channels, and the bridge electrode and the driving electrode located on a different layer have a plurality of intersection nodes, resulting in increased mutual capacitance value. Under strong light irradiation, the bridge electrode is visible at a certain angle, resulting in the exposure of the metal layer where the bridge electrode is located.

In some embodiments, adjacent first touch-control electrode blocks in the same first touch-control electrode are electrically connected through a first conductive connection element, and the adjacent second touch-control electrode blocks in the same second touch-control electrode are electrically connected through a second conductive connection element, the first touch-control electrode block, the second touch-control electrode block and the first conductive connection element are arranged in the same layer and made of the same material. An insulating layer is arranged between the first conductive connection element and the second conductive connection element, and the second conductive connection element is electrically connected to adjacent second touch-control electrode blocks through via holes in the insulating layer.

Moreover, in the related art, in order to facilitate the design of the touch-control unit, the touch-control unit usually includes an even number of pixel units, so that the integrity of the touch-control unit located at the edge of the display region is relatively low, which affects the touch-control function.

Adjacent first touch-control electrode blocks are electrically connected through the first conductive connection element to form a first touch-control electrode, and the first touch-control electrode is connected to a data line.

Adjacent second touch-control electrode blocks are electrically connected through the second conductive connection element to form a second touch-control electrode, and the second touch-control electrode is connected to a data line.

It should be noted that, under different driving manners, the first touch-control electrodes may also be connected to a plurality of data lines, and the second touch-control electrodes may also be connected to the plurality of data lines.

The first touch-control electrodes and the second touch-control electrodes are connected to a touch-control integrated circuit (not shown in the figure) through data lines. The touch-control integrated circuit is, for example, a touch-control chip, which is used for providing driving signals to the first touch-control electrode 110, receiving sensing signals from the second touch-control electrode 120 and processing the sensing signals, so as to realize the touch-control sensing function.

The end of the data line connected to the touch-control integrated circuit may be arranged on the same side of the touch-control region.

The first touch-control electrode block, the second touch-control electrode block, and the first conductive connection element are arranged in the same layer and made of the same material, and the first touch-control electrode block, the second touch-control electrode block, and the first conductive connection element can be formed through a process at a time, thereby simplifying the process.

As shown in FIG. 2, the adjacent first touch-control electrode blocks 111 in the first direction D1 are electrically connected through a first conductive connection element (not shown in FIG. 2) to form a first touch-control electrode 110 extending in the first direction D1, the adjacent second touch-control electrode blocks in the second direction D2 are electrically connected through a second conductive connection element to form a second touch-control electrode 120 extending in the second direction D2.

In some embodiments, the first touch-control electrode block, the second touch-control electrode block and the first conductive connection element all include a grid-shaped structure, consisting of a plurality of metal grids.

In some embodiments, the first touch-control electrode, the second touch-control electrode and the first conductive connection element all include a grid-shaped structure, consisting of the plurality of metal grids.

The first touch-control electrode, the second touch-control electrode and the first conductive connection element are all composed of the grid-shaped structures rather than block-shaped structures, which can prevent the display effect from being affected due to that the sub-pixels on the display panel are blocked by the first touch-control electrode, the second touch-control electrode and the first conductive connection element.

As shown in FIG. 2, FIG. 5, FIG. 7 and FIG. 9, both the first touch-control electrode 110 and the second touch-control electrode 120 are of a grid-shaped structure. Adjacent first touch-control electrode blocks 111 are connected by the first conductive connection element to form an integrated grid-shaped structure. The adjacent second touch-control electrode blocks 121 are connected through the second conductive connection element, and the second conductive connection element electrically connects the adjacent second touch-control electrode blocks 121 through the via holes in the insulating layer.

In some embodiments, the second conductive connection element includes at least two conductive connection patterns arranged at intervals, and each of the conductive connection patterns is used for connecting adjacent second touch-control electrode blocks in the same second touch-control electrode, an orthographic projection of each of the conductive connection patterns on the display functional layer and an orthographic projection of the grid-shaped structure of the first conductive connection element on the display functional layer have at least two intersection nodes.

At least two conductive connection patterns arranged at intervals included in the second conductive connection element are arranged, so as to realize the electrical connection of adjacent second touch-control electrode blocks in the same second touch-control electrode.

In some embodiments, the at least two conductive connection patterns arranged at intervals include at least one group of conductive connection patterns, each group of conductive connection patterns includes two conductive connection patterns, two conductive connection patterns in each group of conductive connection patterns are symmetrical with a center line of each group of conductive connection patterns in the second direction.

In the embodiments of the present disclosure, two conductive connection patterns in each group of conductive connection patterns are symmetrical with a center line of each group of conductive connection patterns in the second direction, which simplifies the design of the second conductive connection element and reduces the process complexity.

In some embodiments, the conductive connection pattern includes two metal grids and a conductive connection line connecting the two metal grids, the conductive connection line includes a first part extending in a third direction and a second part extending in a fourth direction, the first part and the second part are connected with each other, the third direction and the fourth direction are intersected, an included angle between the third direction and the first direction is a sharp angle, and the included angle between the fourth direction and the second direction is the sharp angle.

The grid-shaped structure in the embodiments of the present disclosure is a quadrilateral grid as an example, but it is not limited thereto, for example, it may also be a hexagonal grid. A first part extending in the third direction and a second part extending in the fourth direction included in the conductive connection pattern are arranged, which can avoid that the conductive connection pattern extends too long in a certain direction, resulting in a large range of the second conductive connection element.

In some embodiments, the orthographic projection of the two metal grids of the conductive connection pattern onto the display functional layer and the orthographic projection of the two metal grids of the first conductive connection element onto the display functional layer are overlapped.

The second conductive connection element will be described with reference to FIG. 2, FIG. 4, and FIG. 5.

Figure 4:
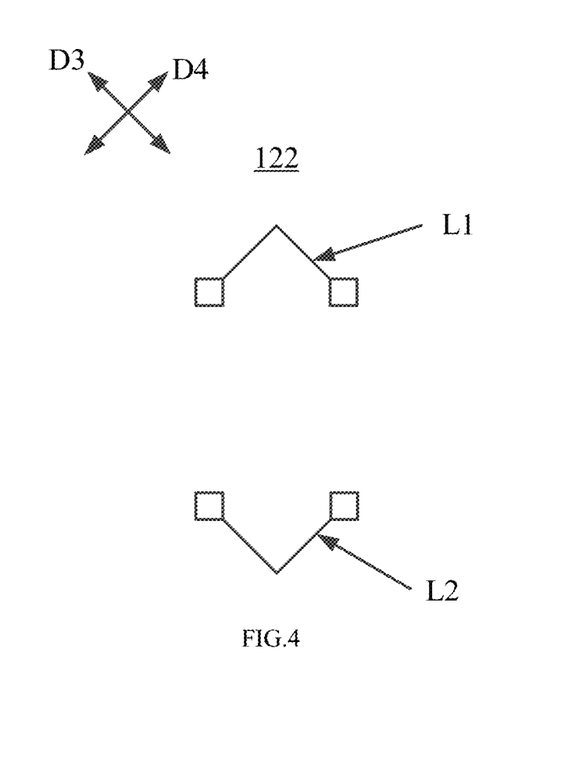
FIG. 4 is a schematic view of a group of conductive connection patterns provided by an embodiment of the present disclosure.

FIG. 4 is a schematic view of a group of conductive connection patterns provided by an embodiment of the present disclosure, corresponding to the second conductive connection element 122 in FIG. 2, and FIG. 4 is an enlarged schematic view of a second conductive connection element shown in FIG. 2. As shown in FIG. 4, the second conductive connection element includes two conductive connection patterns. Each conductive connection pattern includes two metal grids and a conductive connection line connecting the two metal grids. One of the conductive connection patterns connects the two metal grids on two sides through the first conductive connection line L1, and the other conductive connection pattern connects the two metal grids on two sides through the second conductive connection line L2. FIG. 5 is a schematic view showing intersection nodes formed by a group of conductive connection patterns and the first conductive connection element shown in FIG. 4.

The first conductive connection element is provided with a metal grid at a position corresponding to the two metal grids included in each conductive connection pattern, and the position is a double-layer metal grid; and the first conductive connection element is not provided with a metal wire at a position corresponding to the first conductive connection line L1 and the second conductive connection line L2, and the position is a single-layer wire.

Figure 5:
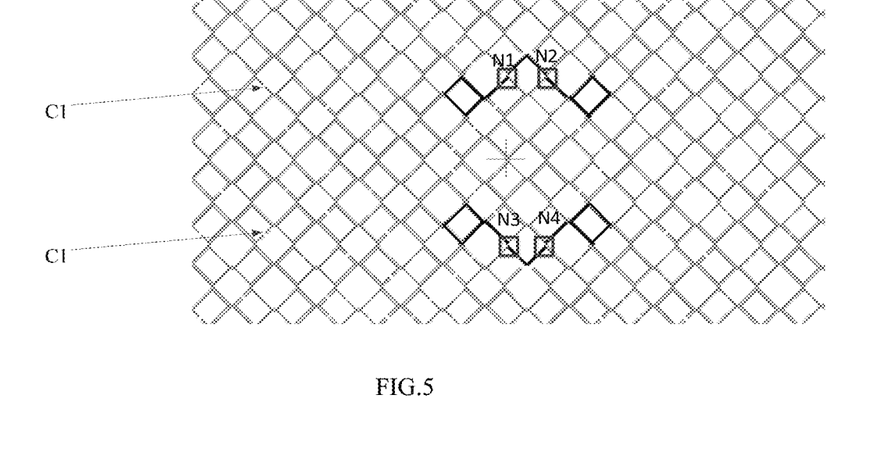
FIG. 5 is a schematic view showing intersection nodes formed by a group of conductive connection patterns and a first conductive connection element shown in FIG. 4.

As shown in FIG. 5, the second conductive connection element and the first conductive connection element form four intersection nodes, which are respectively intersection nodes N1, N2, N3 and N4, so that the mutual capacitance value of the entire touch-control unit in a case that there is no finger touch is 0.608 pF, the mutual capacitance value in a case that there is finger touch is 0.545 pF, and the capacitance change value detected by the touch-control circuit is 0.063 pF, which can maintain touch-control sensitivity in a case that intersection nodes are reduced. Simultaneously, the lengths of the first conductive connection line L1 and the second conductive connection line L2 are both very small, which also reduces the exposed area of the first conductive connection line L1 and the second conductive connection line L2, and reduces the visible risk of the second conductive connection element.

Figure 6:
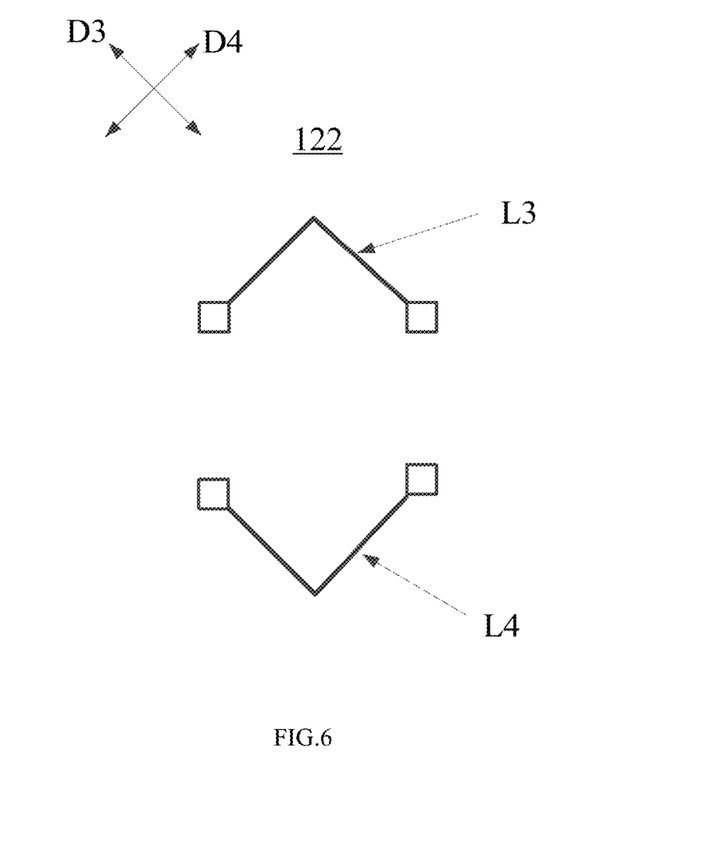
FIG. 6 is a schematic view of another group of conductive connection patterns provided by an embodiment of the present disclosure.
Figure 7:
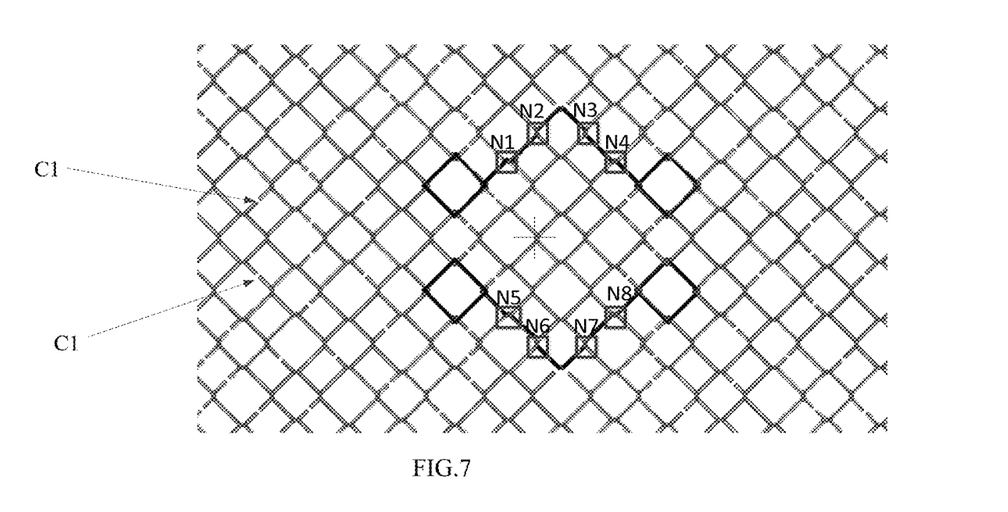
FIG. 7 is a schematic view showing intersection nodes formed by another group of conductive connection patterns and the first conductive connection element shown in FIG. 6.

FIG. 6 is a schematic view of another group of conductive connection patterns provided by an embodiment of the present disclosure, corresponding to the second conductive connection element 122 in FIG. 2, and FIG. 6 is an enlarged schematic view of the second conductive connection element shown in FIG. 2. As shown in FIG. 6, the second conductive connection element includes two conductive connection patterns. Each conductive connection pattern includes two metal grids and a conductive connection line connecting the two metal grids. One of the conductive connection patterns connects the two metal grids on two sides through the third conductive connection line L3, and the other conductive connection pattern connects the two metal grids on two sides through the fourth conductive connection line L4. FIG. 7 is a schematic view showing intersection nodes formed by another group of conductive connection patterns and the first conductive connection element shown in FIG. 6.

The difference between FIG. 6 and FIG. 4 is that the lengths of the third conductive connection line and the fourth conductive connection line are slightly increased.

As shown in FIG. 7, the second conductive connection element and the first conductive connection element form 8 intersection nodes, which are respectively intersection nodes N1 to N8, so that the mutual capacitance value of the entire touch-control unit in a case that there is no finger touch is 0.756 pF, the mutual capacitance value in a case that there is finger touch is 0.694 pF, and the capacitance change value detected by the touch-control circuit is 0.062 pF, which can maintain touch-control sensitivity in a case that intersection nodes are reduced. Simultaneously, the lengths of the third conductive connection line L3 and the fourth conductive connection line L4 are both very small, which also reduces the exposed area of the first conductive connection line L1 and the fourth conductive connection line L4, and reduces the visible risk of the second conductive connection element.

In some embodiments, a grid-shaped structure in a boundary between the first touch-control electrode block and the second touch-control electrode block includes a first incision, the grid-shaped structure includes a plurality of metal grids.

In the embodiments of the present disclosure, one metal grid corresponds to one sub-pixel. In other embodiments, one metal grid may correspond to a plurality of sub-pixels.

The metal grid includes a plurality of metal wires, in order to enable insulation between the first touch-control electrode block 111 and the second touch-control electrode block 121, the metal wire between the first touch-control electrode block 111 and the second touch-control electrode block 121 is broken at the boundary to form an incision.

As shown in FIG. 5 and FIG. 7, the metal wire between the first touch-control electrode block 111 and the second touch-control electrode block 121 has a first incision C1.

In some embodiments, the display panel includes: a plurality of repeating units, each of the repeating units includes four pixel units, each of the pixel units includes four sub-pixels, sixteen sub-pixels of each of the repeating units are arranged in RGBG pixel arrangement form, and the sub-pixel at a top corner of the adjacent repeating units is shared; four metal grids in the plurality of metal grids included in the first touch-control electrode block are corresponding to sub-pixels at four top corners of corresponding repeating units, four metal wires of each of metal grids in the four metal grids do not include incisions.

With four pixels including 16 sub-pixels as a unit, it is ensured that the GBGR at the top corner does not have a broken line. This type of disconnection scheme is more uniform, and the disconnections around the RGB pixels in the entire surface are kept uniform, so as not to affect the color cast.

Figure 8:
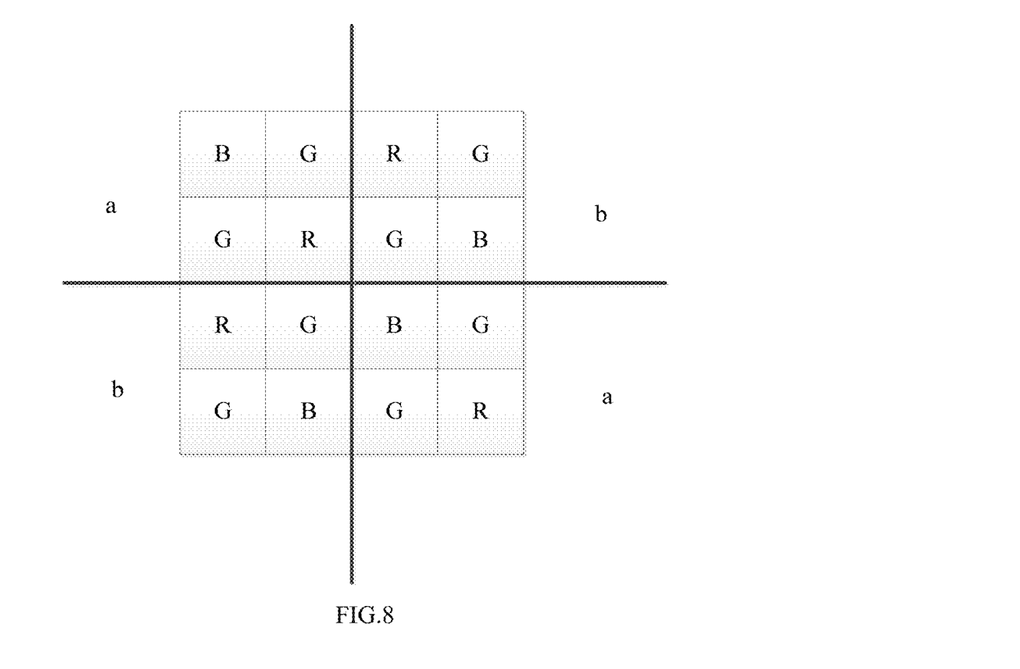
FIG. 8 is a schematic view of repeating units provided by the embodiment of the present disclosure.

FIG. 8 is a schematic view of repeating units provided by embodiments of the present disclosure.

The display panel includes a plurality of repeating units as shown in FIG. 8, each repeating unit includes 4 pixel units, and the 4 pixel units include 2 pixel units a and 2 b-pixel units. The a-pixel unit includes BGGR, and the b-pixel unit includes RGGB.

Figure 9:
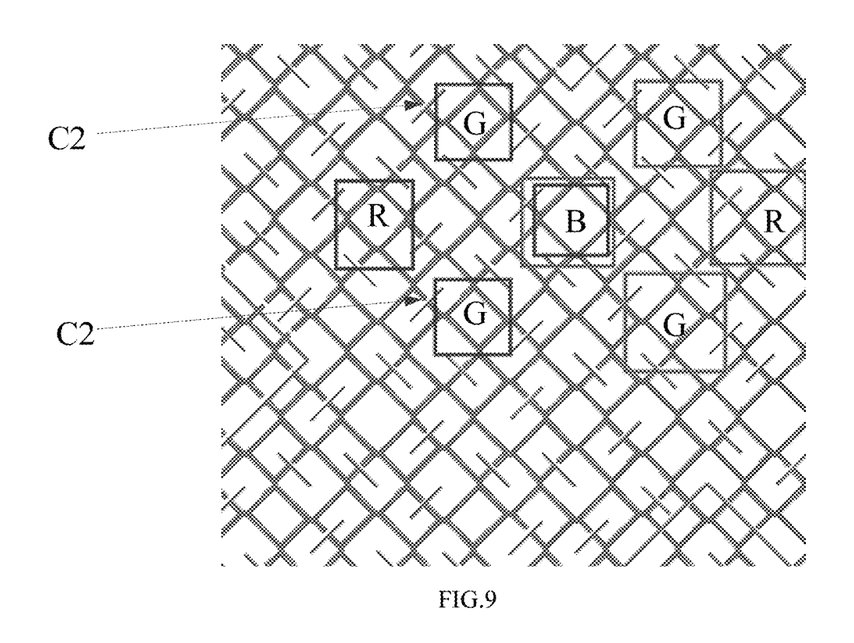
FIG. 9 is a disconnection schematic view of repeating units corresponding to FIG. 8.

FIG. 9 is a disconnection schematic view of the repeating units corresponding to FIG. 8, and the sub-pixels at the four top corners of the repeating units are BGRG. Four metal grids in the plurality of metal grids included in the first touch-control electrode block 111 correspond, in one-to-one manner, to the sub-pixels BGRG at the four top corners of the corresponding repeating unit. As shown in FIG. 9, the metal wires of the four metal grids corresponding to the sub-pixels BGRG at the four top corners of the repeating unit are not disconnected and have no incisions.

As shown in FIG. 9, the B pixel at the top corners of adjacent repeating units are shared.

In some embodiments, the first touch-control electrode block further includes at least one group of metal wires, each group of metal wires includes eight metal wires, the eight metal wires are located around each of metal grids in the four metal grids, and connected to each of metal grids in the four metal grids, four metal wires in the eight metal wires have a second incision.

With 16 sub-pixels of four pixels as a unit, it is ensured that the GBGR at the top corner does not have a broken line. This type of disconnection scheme is more uniform, and the disconnections around the RGB pixels in the entire surface are kept uniform, so as not to affect the color cast.

As shown in FIG. 9, there are 8 metal wires connected around the metal grid corresponding to the sub-pixel B at the top corner, where 4 metal wires are broken to have second incisions C2; there are 8 metal wires connected around the metal grid corresponding to the sub-pixel R at the top corner, where 4 metal wires are broken to have second incisions C2; and the two sub-pixels G at the top corners respectively correspond to two metal grids, and 8 metal wires are respectively connected around each metal, where 4 metal wires are broken to have second incisions C2.

In some embodiments, among the eight metal wires, metal wires with the second incisions and metal wires without the second incisions are arranged alternately in boundary extension directions of the metal grids.

Among the eight metal wires, metal wires with the second incisions and metal wires without the second incisions are arranged alternately in boundary extension directions of the metal grids, so that the disconnections are more uniform, and the disconnections around the RGB pixels in the entire surface are kept uniform, so as not to affect the color cast.

In some embodiments, the touch-control layer includes a plurality of touch-control units, and each of the touch-control units includes: at least a part of the two first touch-control electrode blocks connected at an intersection, and at least a part of the two second touch-control electrode blocks connected at the intersection; where the touch-control unit covers the corresponding M×M pixel units in the display panel, where M is an odd number.

The touch-control unit is enabled to cover the pixel units of odd rows and odd columns in the display panel, which can ensure the integrity of the touch-control unit at the edge of touch-control layer, and improve edge touch-control performance.

Figure 10:
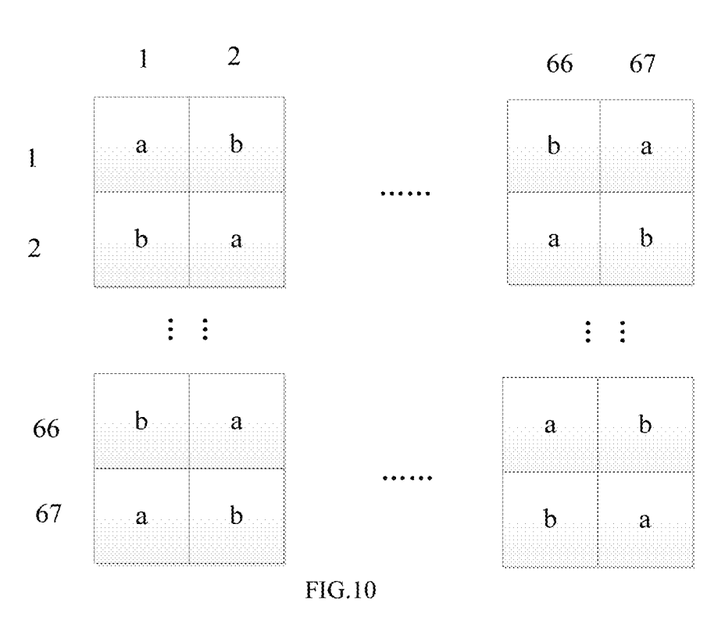
FIG. 10 is a schematic view of pixel units corresponding to the touch-control unit provided by an embodiment of the present disclosure.

FIG. 10 is a schematic view of pixel units corresponding to touch-control units provided in an embodiment of the present disclosure. As shown in FIG. 10, the touch-control unit correspondingly covers 67 rows and 67 columns of pixel units in the display panel. In this case, the size d1 of the touch-control unit is 4314.8 μm, the integrity of the touch-control unit at the edge of the touch-control layer is relatively high.

Whether the touch-control unit adopts pixel units in odd rows and columns or in even rows and columns depends on the size of the panel.

Figure 11:
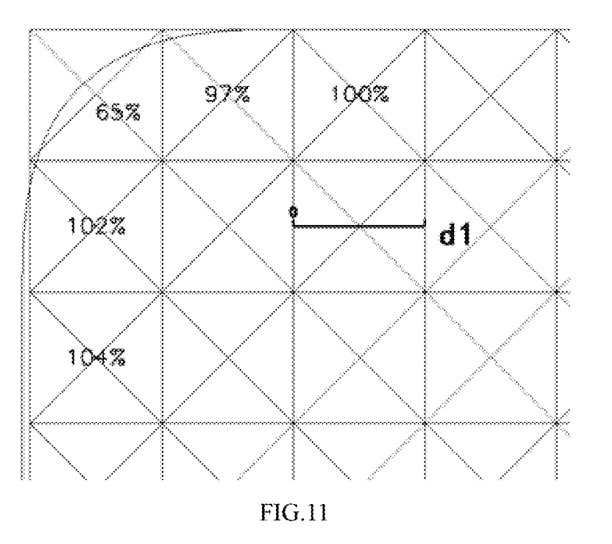
FIG. 11 is an integrity schematic view of a touch-control layer provided by an embodiment of the present disclosure.

FIG. 11 is an integrity schematic view of a touch-control layer provided by an embodiment of the present disclosure. As shown in FIG. 11, the integrity of the touch-control unit at the upper left corner of the touch-control layer reaches 65%, the integrity of the touch-control unit located on the upper edge adjacent to the touch-control unit at the upper left corner is 97%, the integrity of the touch-control unit adjacent to the touch-control unit on the upper edge reaches 100%, the integrity of the touch-control unit located on the left edge adjacent to the touch-control unit on the upper left corner is 102%, and the integrity of the touch-control unit adjacent to the touch-control unit on the left edge reaches 104%.

It should be noted that whether the number of touch-control units is odd or even should be determined according to the size of the panel.

In some embodiments, the touch-control layer includes a plurality of touch-control modules, and each touch-control module includes four touch-control units arranged in a 2×2 matrix.

In the embodiments of the present disclosure, each touch-control module includes four touch-control units, which can ensure that the entire display panel is composed of even-numbered columns of pixel units, thereby ensuring the symmetry of the display panel.

In a case that the touch-control layer formed in the display panel provided by the embodiments of the present disclosure, four touch-control units need to be used as a touch-control module to realize splicing of the entire touch-control layer, which can ensure the integrity of the edge of touch-control layer.

Figure 12:
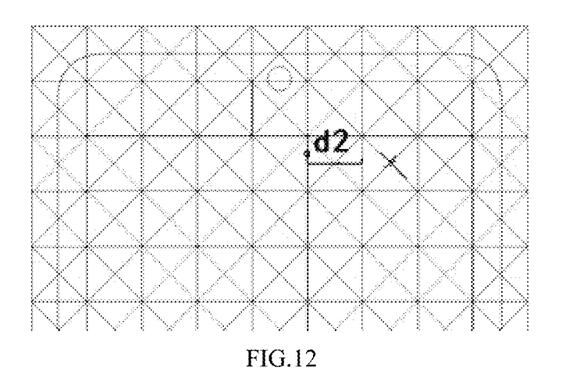
FIG. 12 is a schematic view of a touch-control module provided by an embodiment of the present disclosure.

FIG. 12 is a schematic view of a touch-control module provided by an embodiment of the present disclosure. As shown in FIG. 12, the size d2 of the touch-control module is 8629.6 μm.

An embodiment of the present disclosure also provides a touch-control display apparatus, including the above-mentioned touch-control display panel.

The touch-control layer provided by the embodiments of the present disclosure can reduce the self-capacitance (parasitic capacitance) on the first touch-control electrode block by providing at least one first hollowed-out region and at least one second hollowed-out region on the first touch-control electrode block, thereby improving the touch-control sensitivity of the touch-control layer.

Embodiments of the present disclosure also provide a manufacturing method of touch-control layer, including:

forming a plurality of first touch-control electrodes extending in a first direction and arranged in a second direction, where the first touch-control electrode includes a plurality of first touch-control electrode blocks, each of the first touch-control electrode blocks includes at least one first hollowed-out region and at least one second hollowed-out region that surrounds the first hollowed-out region and has a certain spacing from the first hollowed-out region, and an area of the first hollowed-out region is larger than an area of the second hollowed-out region;

forming a plurality of second touch-control electrodes extending in the second direction and arranged in the first direction, where the first direction and the second direction are intersected, and the plurality of first touch-control electrodes and the plurality of second touch-control electrodes are arranged being intersected and insulated; and forming at least one first dummy electrode and at least one second dummy electrode, where the first dummy electrode is located in the corresponding first hollowed-out region, the second dummy electrode is located in the corresponding second hollowed-out region, and the at least one first dummy electrode and the at least one second dummy electrode are arranged in the same layer as the first touch-control electrodes, and insulated from the first touch-control electrodes.

The manufacturing method of touch-control layer provided by the embodiments of the present disclosure can reduce the self-capacitance (parasitic capacitance) on the first touch-control electrode block by providing at least one first hollowed-out region and at least one second hollowed-out region on the first touch-control electrode block, thereby improving the touch-control sensitivity of the touch-control layer.

The touch-control display apparatus includes but not limited to: a radio frequency unit, a network module, an audio output unit, an input unit, a sensor, a display unit, a user input unit, an interface unit, a memory, a processor, and a power supply and other components. Those skilled in the art can understand that the structure of the above-mentioned touch-control display apparatus does not constitute a limitation on the display apparatus, and the display apparatus may include more or less of the above-mentioned components, or combine certain components, or arrange different components. In the embodiments of the present disclosure, touch-control display apparatus includes but are not limited to a monitor, a mobile phone, a tablet computer, a television, a wearable electronic device, a navigation display device, and the like.

The touch-control display apparatus may be any product or component with a display function such as a liquid crystal TV, a liquid crystal display, a digital photo frame, a mobile phone, a tablet computer, where the touch-control display apparatus also includes a flexible circuit board, a printed circuit board and backplane.

In each method embodiment of the present disclosure, the serial numbers of the steps cannot be used to limit the order of the steps. For those ordinarily skilled in the art, on the premise of not paying creative efforts, the sequential changes of steps are also within the protection scope of the present disclosure.

It should be noted that each embodiment in this specification is described in a progressive manner, the same and similar parts of embodiments can be referred to each other, and each embodiment focuses on the differences from other embodiments. In particular, as for the embodiment, since it is basically similar to the product embodiment, the description is relatively simple, and for related parts, refer to the description of the product embodiment.

Unless otherwise defined, the technical terms or scientific terms used in the present disclosure shall have the usual meanings understood by those skilled in the art to which the present disclosure belongs. "First", "second" and similar words used in the present disclosure do not indicate any order, quantity or importance, but are only used to distinguish different components. "Including" or "comprising" and similar words mean that the elements or items appearing before the word include the elements or items listed after the word and their equivalents, without excluding other elements or items. Words such as "connect" or "link" are not limited to physical or mechanical connections, but may include electrical connections, whether direct or indirect. "Up", "Down", "Left", "Right" and so on are only used to indicate the relative positional relationship. After the absolute position of the described object changes, the relative positional relationship may also changes accordingly.

It could be understood that when an element such as a layer, film, region, or substrate is referred as being "on" or "under" other element, the element may be located "on" or "under" the other element "directly", or intervening element may be present.

In the description of the above-mentioned embodiments, specific features, structures, materials or characteristics may be combined in any one or more embodiments or examples in an appropriate manner.

The above are only specific embodiments of the present disclosure, but the protection scope of the present disclosure is not limited thereto. Anyone skilled in the art within the technical scope disclosed in the present disclosure can easily think of changes or substitutions, which should be covered by the protection scope of the present disclosure. Therefore, the protection scope of the present disclosure should be subjected to the protection scope of the claims.

What is claimed is:

1. A touch-control display panel, comprising a touch-control layer and a display functional layer, wherein the touch-control layer is located at a light-emitting side of the display functional layer, and the touch-control layer comprises a plurality of first touch-control electrodes extending in a first direction and arranged in a second direction, and a plurality of second touch-control electrodes extending in the second direction and arranged in the first direction, and the first direction and the second direction are intersected;
the plurality of first touch-control electrodes and the plurality of second touch-control electrodes are arranged being intersected and insulated;
wherein each of the first touch-control electrodes comprises a plurality of first touch-control electrode blocks, each of the first touch-control electrode blocks comprises at least one first hollowed-out region and at least one second hollowed-out region that surrounds the first hollowed-out region and has a certain spacing from the first hollowed-out region, an area of the first hollowed-out region is larger than an area of the second hollowed-out region; and
the touch-control layer further comprises at least one first dummy electrode and at least one second dummy electrode, wherein the first dummy electrode is located in the corresponding first hollowed-out region, and the second dummy electrode is located in the corresponding second hollowed-out region, the at least one first dummy electrode and the at least one second dummy electrode are arranged in a same layer as the first touch-control electrodes, and are insulated from the first touch-control electrodes,
wherein the display functional layer comprises:
a plurality of repeating units, each of the repeating units comprises four pixel units, each of the pixel units comprises four sub-pixels, sixteen sub-pixels of each of the repeating units are arranged in RGBG pixel arrangement form, and a sub-pixel at a top corner of the adjacent repeating units is shared; and
four metal grids in the plurality of metal grids comprised in each of the first touch-control electrode blocks are respectively corresponding to sub-pixels at four top corners of corresponding repeating units, four metal wires of each of metal grids in the four metal grids do not comprise incisions.

2. The touch-control display panel according to claim 1, wherein each of the second touch-control electrodes comprises a plurality of second touch-control electrode blocks, and each of the second touch-control electrode blocks comprises at least one third hollowed-out region and at least one fourth hollowed-out region that surrounds the third hollowed-out region and has a certain spacing from the third hollowed-out region, an area of the third hollowed-out region is larger than an area of the fourth hollowed-out region; and
the touch-control layer further comprises at least one third dummy electrode and at least one fourth dummy electrode, wherein the third dummy electrode is located in the corresponding third hollowed-out region, and the fourth dummy electrode is located in the corresponding fourth hollowed-out region, the at least one third dummy electrode and the at least one fourth dummy electrode are arranged in a same layer as the second touch-control electrodes, and are insulated from the second touch-control electrodes.

3. The touch-control display panel according to claim 2, wherein the second hollowed-out regions have a same area, and the fourth hollowed-out regions have a same area.

4. The touch-control display panel according to claim 2, wherein an area of the first hollowed-out region is the same as that of the third hollowed-out region, and an area of the second hollowed-out region is the same as that of the fourth hollowed-out region.

5. The touch-control display panel according to claim 2, wherein the number of the second hollowed-out region is the same as that of the fourth hollowed-out region.

6. The touch-control display panel according to claim 2, wherein shapes of the first hollowed-out region, the second hollowed-out region, the third hollowed-out region and the fourth hollowed-out region are approximately square.

7. The touch-control display panel according to claim 1, wherein an edge of each of the first touch-control electrode blocks comprises a plurality of first protrusions;
an edge of each of the second touch-control electrode blocks comprises a plurality of second protrusions; and
the plurality of first protrusions and the plurality of second protrusions are nested with each other.

8. The touch-control display panel according to claim 7, wherein an edge of the first dummy electrode comprises a plurality of third protrusions; and an edge of the third dummy electrode comprises a plurality of fourth protrusions.

9. The touch-control display panel according to claim 8, wherein the first protrusion and the second protrusion have a same shape, the third protrusion and the fourth protrusion have a same shape, and shapes of the first protrusion, the second protrusion, the third protrusion and the fourth protrusion include at least one of the following: convex, rectangle, triangle or trapezoid.

10. The touch-control display panel according to claim 1, wherein adjacent first touch-control electrode blocks in the same first touch-control electrode are electrically connected through a first conductive connection element, and adjacent second touch-control electrode blocks in the same second touch-control electrode are electrically connected through a second conductive connection element, the first touch-control electrode blocks, the second touch-control electrode blocks, and the first conductive connection element are arranged in the same layer and made of the same material, an insulating layer is arranged between the first conductive connection element and the second conductive connection element, and the second conductive connection element is electrically connected to adjacent second touch-control electrode blocks through via a hole in the insulating layer.

11. The touch-control display panel according to claim 10, wherein each of the first touch-control electrode block, the second touch-control electrode block and the first conductive connection element comprises a grid-shaped structure, and is formed by a plurality of metal grids.

12. The touch-control display panel according to claim 10, wherein a grid-shaped structure at a boundary between the first touch-control electrode block and the second touch-control electrode block comprises a first incision.

13. The touch-control display panel according to claim 11, wherein the second conductive connection element comprises at least two conductive connection patterns arranged at intervals, and each of the conductive connection patterns is configured to connect adjacent second touch-control electrode blocks in the same second touch-control electrode, an orthographic projection of each of the conductive connection patterns onto the display functional layer and an orthographic projection of the grid-shaped structure of the first conductive connection element onto the display functional layer have at least two intersection nodes.

14. The touch-control display panel according to claim 10, wherein the at least two conductive connection patterns arranged at intervals comprise at least one group of conductive connection patterns, each group of conductive connection patterns comprises two conductive connection patterns, two conductive connection patterns in each group of conductive connection patterns are symmetrical with a center line of each group of conductive connection patterns in the second direction.

15. The touch-control display panel according to claim 10, wherein each of the conductive connection patterns comprises two metal grids and a conductive connection line for connecting the two metal grids, the conductive connection line comprises a first part extending in a third direction and a second part extending in a fourth direction, the first part and the second part are connected with each other, the third direction and the fourth direction are intersected, an included angle between the third direction and the first direction is a sharp angle, and the included angle between the fourth direction and the second direction is a sharp angle; and/or     wherein an orthographic projection of the two metal grids of each of the conductive connection patterns onto the display functional layer and an orthographic projection of the two metal grids of the first conductive connection element onto the display functional layer are overlapped.

16. The touch-control display panel according to claim 1, wherein the touch-control layer comprises a plurality of touch-control units, and each of the touch-control units comprises:

at least a part of the two first touch-control electrode blocks connected at an intersection, and at least a part of the two second touch-control electrode blocks connected at the intersection;

wherein each of the touch-control units covers the corresponding M×M pixel units in the display panel, wherein M is an odd number,     wherein the touch-control layer comprises a plurality of touch-control modules, and each of the touch-control modules comprises four touch-control units arranged in a 2×2 matrix.

17. A touch-control display apparatus, comprising the touch-control display panel according to any one of claim 1.

* * * * *